US008534725B1

(12) United States Patent
Burke

(10) Patent No.: US 8,534,725 B1
(45) Date of Patent: Sep. 17, 2013

(54) PORTABLE WEARABLE ANIMAL WASTE COLLECTION AND DISPOSAL DEVICE, SYSTEM AND METHOD OF USE THEREOF

(76) Inventor: Nancy Burke, Oneonta, NY (US)

( * ) Notice: Subject to any disclaimer, the term of this patent is extended or adjusted under 35 U.S.C. 154(b) by 0 days.

(21) Appl. No.: 13/599,305

(22) Filed: Aug. 30, 2012

(51) Int. Cl.
*A01K 29/00* (2006.01)

(52) U.S. Cl.
USPC .............................. 294/1.5; 224/682; 119/161

(58) Field of Classification Search
USPC ........... 294/1.3, 1.4, 1.5; 119/161; 15/257.1; 224/219, 904, 920, 682
See application file for complete search history.

(56) References Cited

U.S. PATENT DOCUMENTS

| | | | | |
|---|---|---|---|---|
| 3,380,307 A | * | 4/1968 | De Frank | 73/427 |
| 3,872,831 A | | 3/1975 | Cassidy | |
| 3,937,509 A | | 2/1976 | Hufnagel | |
| 4,262,948 A | | 4/1981 | Emme | |
| D310,436 S | * | 9/1990 | Krauth | D30/161 |
| 5,060,835 A | * | 10/1991 | Payne | 224/148.2 |
| 5,403,050 A | * | 4/1995 | Searing et al. | 294/1.5 |
| 5,447,227 A | * | 9/1995 | Kosberg | 206/233 |
| 5,713,616 A | | 2/1998 | Knudson | |
| 6,129,096 A | * | 10/2000 | Johnson | 134/34 |
| 6,199,737 B1 | | 3/2001 | Ringelstetter | |
| 6,241,135 B1 | | 6/2001 | Thatcher | |
| 6,257,473 B1 | | 7/2001 | Ringelstetter | |
| D453,067 S | | 1/2002 | Cody | |
| 6,942,264 B1 | | 9/2005 | Mendez | |
| 7,073,462 B1 | * | 7/2006 | Layman | 119/161 |
| 7,128,352 B1 | | 10/2006 | Phippen | |
| 7,267,381 B2 | | 9/2007 | Cafferty et al. | |
| 7,588,273 B2 | | 9/2009 | Tittemore | |
| D613,915 S | | 4/2010 | Plotkin | |
| D617,061 S | | 6/2010 | Su | |
| 7,854,455 B2 | | 12/2010 | Ruscil et al. | |
| 7,954,868 B1 | | 6/2011 | Van Pelt | |
| 8,123,266 B1 | | 2/2012 | Jone et al. | |
| 2005/0263087 A1 | | 12/2005 | Livingston, III | |
| 2009/0045639 A1 | | 2/2009 | Shalhoub | |
| 2009/0096227 A1 | | 4/2009 | Pender et al. | |
| 2010/0006040 A1 | | 1/2010 | Valliant | |
| 2010/0072765 A1 | | 3/2010 | Granado | |
| 2011/0057463 A1 | | 3/2011 | Chen | |
| 2001/0132952 | | 6/2011 | Peterson-Malesci | |

* cited by examiner

*Primary Examiner* — Dean Kramer
(74) *Attorney, Agent, or Firm* — Schmeiser, Olsen & Watts LLP

(57) ABSTRACT

A wearable animal waste collection device comprising a wearable structure configured to be worn by a user, a first securing portion attached to the wearable structure, the first securing portion structured to removably accommodate a top cover portion, and a second securing portion attached to the wearable structure, the second securing portion structured to removably accommodate a direct collection device, wherein the direct collection device directly collects an animal waste before the animal waste reaches a ground surface is provided. Furthermore, an associated method is also provided.

18 Claims, 6 Drawing Sheets

… (1/8)

PORTABLE WEARABLE ANIMAL WASTE COLLECTION AND DISPOSAL DEVICE, SYSTEM AND METHOD OF USE THEREOF

FIELD OF TECHNOLOGY

The following relates to collecting and disposing animal waste and more specifically to embodiments of a wearable device and system for collection and temporary storage of animal waste.

BACKGROUND

A pet is like a member of the family, and can bring many joys in their owners' everyday lives. However, owning a pet carries many responsibilities, including cleaning up after the pet after a bowel movement, and taking the pet outside for occasional or frequent walks or laps in the backyard. Most often pets relieve themselves outdoors, especially when the owner or dog-walker is walking the dog around the block. In the event the pet does have a bowel movement while out on a walk, or somewhere outdoors, the dog-walker is responsible for picking up and removing the waste. Picking up and removing the animal waste typically requires the dog-walker to bend down and grab the feces with their hand covered in a plastic bag, which is a distasteful task for many people. The plastic bag sometimes tears causing a spill of the animal waste. Moreover, pets sometimes defecate more than once at different locations, which forces the dog-walker to reuse the plastic bag that has already been folded inside out to avoid touching the feces. In other words, it is distasteful to pick up animal waste and it is very difficult to pick up the animal waste more than once using a plastic without exposure to unsanitary conditions.

Thus, a need exists for an apparatus, system, and method for direct animal waste collection and disposal, capable of multiple uses without exposure to unsanitary conditions.

SUMMARY

A first general aspect relates to a wearable animal waste collection device comprising a wearable structure configured to be worn by a user, a first securing means attached to the wearable structure, the first securing means structured to removably accommodate a top cover portion, and a second securing means attached to the wearable structure, the second securing means structured to removably accommodate a direct collection device, wherein the direct collection device directly collects an animal waste before the animal waste reaches a ground surface.

A second general aspect relates to a wearable animal waste collection device comprising a wearable structure configured to be worn around a waist of a user, a top cover portion secured by a first securing means when in a first position, the first securing means attached to the wearable structure, and a direct collection device having a rigid collection portion and a rigid handle portion, the direct collection device being secured by a second securing means when in the first position and a second position, wherein the second securing means is attached to the wearable structure, wherein the top cover portion is placed into engagement with the rigid collection portion in the second position.

A third general aspect relates to a method of animal waste collection comprising providing a wearable animal waste collection device comprising a wearable structure configured to be worn around a waist of a user, a top cover portion secured by a first securing means attached to the wearable structure, and a direct collection device having a rigid collection portion and a rigid handle portion, the direct collection device being secured by a second securing means attached to the wearable structure, wherein an animal waste is collected with the direct collection device before the animal waste reaches a ground surface, wherein the animal waste is temporarily stored in the rigid collection portion of the direct collection device.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
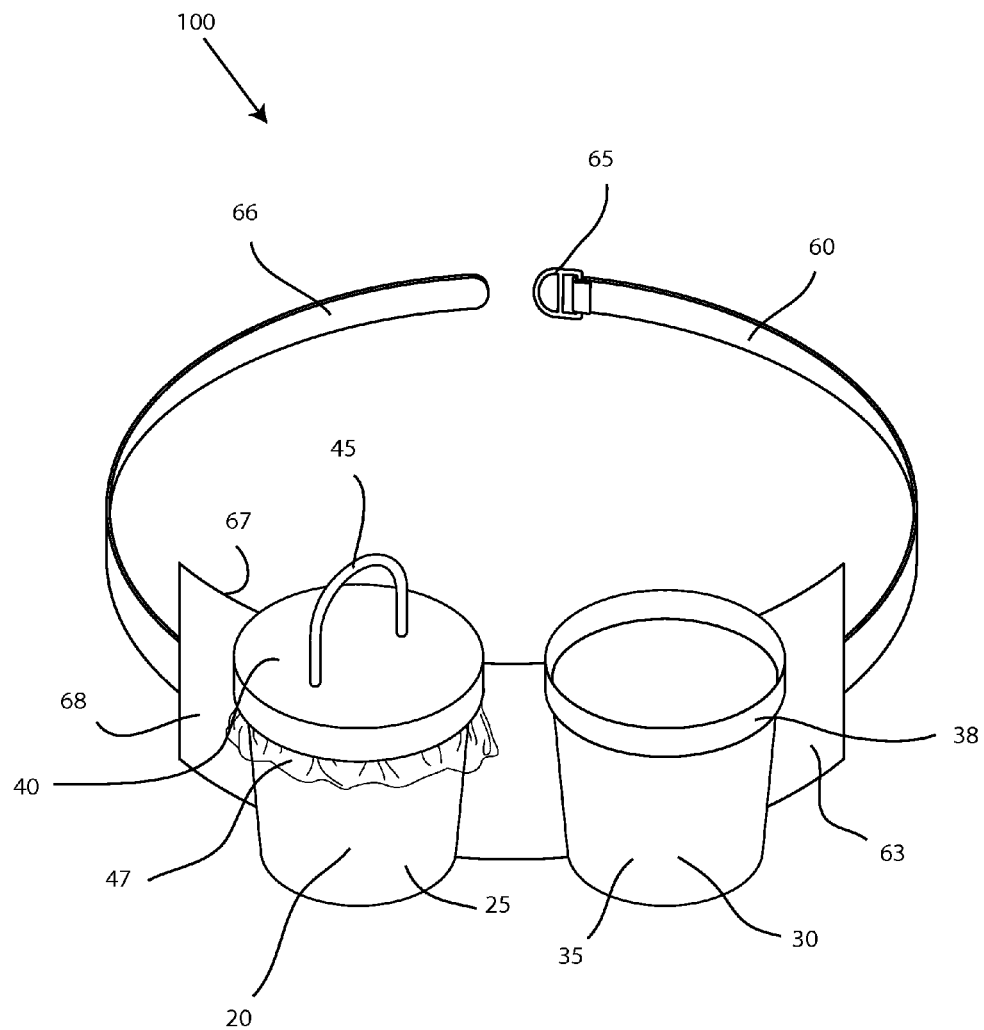
FIG. 1 depicts a perspective view of an embodiment of a wearable animal waste collection device.

Referring to the drawings, FIG. 1 depicts an embodiment of a wearable animal waste collection device 100. Embodiments of the wearable animal waste collection device 100 may be a portable dog toilet for convenient and sanitary collection of animal waste. Embodiments of the wearable animal waste collection device 100 may be worn by a user 10. User 10 may be a human being, a pet owner, a dog-walker, an adult, a child, or any person having a torso to accommodate, wear, support, carry, etc., the wearable animal waste collection device 100. However, the wearable animal waste collection device 100 may be attached to an inanimate object, such as a baby stroller, bike, or any structure capable of accommodating, wearing, carrying, supporting, etc., the wearable animal waste collection device 100. Moreover, embodiments of the wearable animal waste collection device 100 may be worn by a user 10 while outdoors in a presence of an animal, wherein the animal could have a bowel movement. Embodiments of an animal may include a pet, such as a dog, cat, pig, fox, and the like, or any domesticated or trained animal where a user 10 is responsible for cleaning up after the animal. In most embodiments, the wearable animal waste collection device 100 worn by the user 10 is to responsibly, conveniently, and sanitarily collect, temporarily store, and dispose of dog feces. Accordingly, the wearable animal waste collection device 100 may be worn by the user 10 while out walking an animal, such as a dog, and not have to worry about a collection means for animal waste on other's property.

Referring still to FIG. 1, embodiments of the wearable animal waste collection device 100 may include a wearable structure 60, a first securing means 20, a second securing means 30, and a direct collection means 50. Embodiments of the wearable animal waste collection device 100 may include a wearable structure 60 configured to be worn by a user 10, a first securing means 20 attached to the wearable structure 60, the first securing means 20 structured to removably accommodate a top cover portion 40, and a second securing means 30 attached to the wearable structure 60, the second securing means 30 structured to removably accommodate a direct collection device 50, wherein the direct collection device 50 directly collects an animal waste before the animal waste reaches a ground surface. Further embodiments of the wearable animal waste collection device 100 may include a wearable structure 60 configured to be worn around a waist of a user 10, a top cover portion 40 secured by a first securing means 20 when in a first position, the first securing means 20 attached to the wearable structure 60, and a direct collection device 50 having a rigid collection portion 55 and a rigid handle portion 54, the direct collection device 50 being secured by a second securing means 30 when in the first position and a second position, wherein the second securing means 30 is attached to the wearable structure 60, wherein the top cover portion 40 is placed into engagement with the rigid collection portion 55 in the second position.

Embodiments of the wearable animal waste collection device 100 may include a wearable structure 60. Embodiments of the wearable structure 60 may be a structure or article that can be worn by a user 10, or releasably fastened to an object. Embodiments of the wearable structure 60 may be adjustable to accommodate users of different sizes. Embodiments of the wearable structure 60 may include a band portion 66 having a fastening means 65 attached to at least one end of the band portion 66. Embodiments of the band portion 66 may be configured to extend around a user's torso proximate the hips of the user 10 when being worn by the user 10. Embodiments of the band portion 66 may be a band, a strap, a belt, a flexible band, a flexible strap, a web band, a woven cloth band, nylon band, or a section of material configured to be wrapped around a torso of a user 10. The band portion 66 may have various lengths, widths, and thicknesses, and may be comprised of various materials. For instance, embodiments of the band portion 66 may be made of a heavy cloth, leather, plastic, nylon, string(s), or a combination thereof, may be approximately 1" wide. One end of the band portion 66 may include a fastening means 65, wherein the fastening means 65 cooperates with the other end of the band portion 66 to releasable secure or fasten the wearable structure 60 to the user 10 or an object. In an exemplary embodiment, the ends of the band portion 66 join together and are releasably fastened by the fastening member 65 in front of the user's abdomen. Embodiments of the fastening means 65 may be a conventional belt buckle, a heel roller buckle, a loop and hook buckle, a clamp buckle, a box frame buckle, a two ring fastener, and the like.

Furthermore, embodiments of the wearable structure 60 may include an attachment portion 63. Embodiments of the attachment portion 63 may be a structure or section of material that can both spaciously accommodate and physically support the mounting of additional components of the wearable animal waste collection device 100 to the wearable structure 60. Embodiments of the attachment portion 63 may be attached, fastened, adhered, affixed, joined, and the like, to the band portion 66. Alternatively, the attachment portion 63 may be integral to the band portion 66. The attachment portion 63 may be comprised of the same material as the band portion 66, or may be comprised of a different material than the band portion 66. For instance, the attachment portion 63 may be a plastic sheet-like structure affixed to a leather, nylon, cotton, or woven cloth band portion 66. Further embodiments of the attachment portion 63 may include a combination of a conformal material, such as a plastic or rubber to conform to the user's back or hips, and a harder plastic for the mounting of the first and second securing means 20, 30. Embodiments of the attachment portion 63 may be located proximate or otherwise near a center location between the ends of the band portion 66; however, the attachment portion 63 may be located at any point along the band portion 66. The location of the attachment portion 63 can be adjustable, slidably or otherwise, for repositioning of the attachment portion 63 to adjust to different shapes and sizes of the user, provide easier access to the direct collection device 50, and overall comfortability of the user 10. Embodiments of the attachment portion 63 may have an increased width and thickness of the band portion 66, and the thickness and width may vary depending on the weight of the additional components of the wearable animal waste collection device 100, including the direct collection device 50. In one embodiment, a width measured horizontally across the attachment portion 63 may be between 13" and 17". In another embodiment, a width measured horizontally across the attachment portion 63 may be 15.5" Further, an embodiment of a length measured vertically across the attachment portion 63 may be between 4" and 7". In another embodiment, a length measured vertically across the attachment portion 63 may be 6.25". Those skilled in the art should appreciate that the dimensions of the attachment portion 63 may vary to accommodate various design specifications and practical requirements, such as the size of the user 10 or a size of the animal. Moreover, embodiments of the attachment portion 63 may be configured to provide a surface for the mounting of a first securing means 20 and a second securing means 30. In other words, embodiments of the attachment portion 63 of the wearable structure 60 may include a first surface 67 and a second surface 68, wherein the first surface 67 may be configured to rest against a back or portion of the user 10 and the second surface 68 may be a mounting surface configured to accept, accommodate, engage, etc., the first and securing means 20, 30.

Figure 2A:
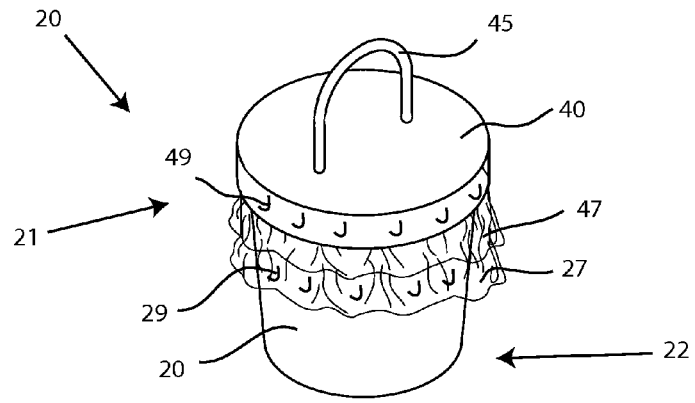
FIG. 2A depicts a perspective view of a first embodiment of a first securing means.
Figure 2B:
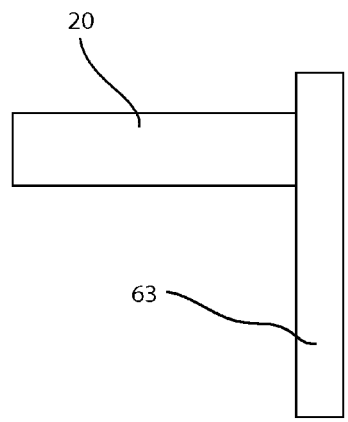
FIG. 2B depicts a side view of a second embodiment of the first securing means.
Figure 2C:
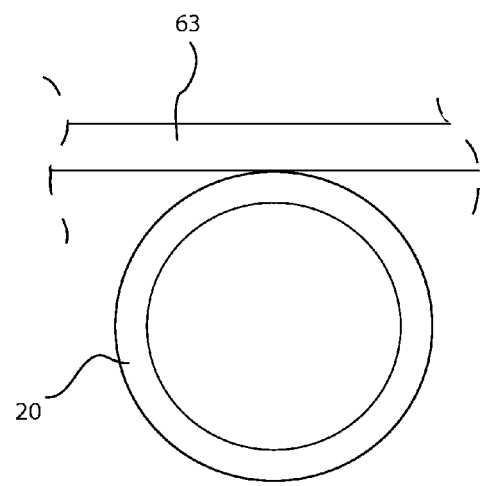
FIG. 2C depicts a top view of a second embodiment of the first securing means.

With continued reference to FIG. 1, and with additional reference to FIG. 2, embodiments of the wearable animal waste collection device 100 may include a first securing means 20, or first securing portion 20. Embodiments of the first securing means 20 may be configured to removably secure, support, hold, accommodate, carry, etc., a top portion 40, the top cover portion 40 configured for placement onto the direct collection device 50 to cover the collected animal waste, described in greater detail infra. Embodiments of the first securing portion 20 may be attached, affixed, fastened, mounted, adhered, joined, etc. to the wearable structure 60. Embodiments of the first securing means 20 may be directly attached to the attachment portion 63 of the wearable structure 60. Alternatively, the first securing means 20 may be attached directly to the band portion 66. Embodiments of the first securing means 20 may be a structure configured to releasably hold the top cover portion 40. In one embodiment, the first securing means 20 may be a cup-like device having a top end 21 and a bottom end 22, and a body 25 defining the first securing means 20 between the top end 21 and the bottom end 22. Thus, the top cover portion 40 may be placed onto a top end 21, which may hold, support, releasably engage, etc., the top cover portion 40 until the top cover portion 40 is needed. Embodiments of the cup-like first securing means 20 may have a volume or space within the body 25 for storage of items, such as replacement liners, cell phone, keys, and the like. In another embodiment, as shown in FIGS. 2B and 2C, the first securing means 20 may be a ring-like structure that protrudes from the second, mounting surface 68 of the attachment portion 63 to support the top portion 40. For example, instead of the first securing means 20 being comprised of a top end 21, a bottom end 22, and a body 25 having volume therebetween, embodiments of the first securing means 20 may simply include a solid ring having a diameter slightly smaller than the top portion 40 to accommodate, hold, releasably engage, etc., the top portion 40. The first securing means 20 may be available in different sizes, depending on the size of the wearable structure 60 or the size of the animal. In one embodiment, the first securing means 20 may have a largest diameter between 3" and 5", and a height between 2" and 5".

Moreover, embodiments of the first securing means 20 may be lined with a disposable plastic liner 27 to protect or prevent contact between animal feces and the first securing means 20. The disposable liner 27 may fit within the first securing means 20, wherein a portion of the disposable liner 27 extends beyond and outside the first securing means 20. The portion of the disposable liner 27 extending outside the first securing means 20 may interact with a plurality of hook members 29 located along an outer surface or rim of the first securing means 20. For instance, the disposable liner 27 may be fastened to the outer surface of the first securing means 20 by gripping the liner 27 and stretching or placing it into contact with the hook members 29 to secure the liner 27 in place, which may avoid the liner 27 from collapsing into the opening of the first securing means 20 if/when a soiled top cover portion 40 (or the liner 47 thereof) is engaged with the first securing means 20. However, other fastening devices may be used to secure the liner 27 to the first securing means 20, such as an elastic band that may go around the liner 27 and secure the liner 27 to the outer surface or other portion of the first securing means 20, or an adhesive applied to the plastic liner prior to installation within the first securing means 20. Furthermore, embodiments of the first securing means 20 may be comprised of a plastic material, a composite material, a hard plastic, metal, rubber, and a combination thereof.

Figure 3A:
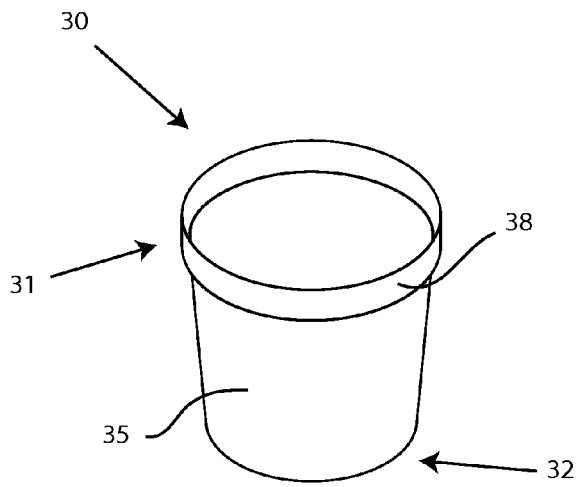
FIG. 3A depicts a perspective view of a first embodiment of a second securing means.
Figure 3B:
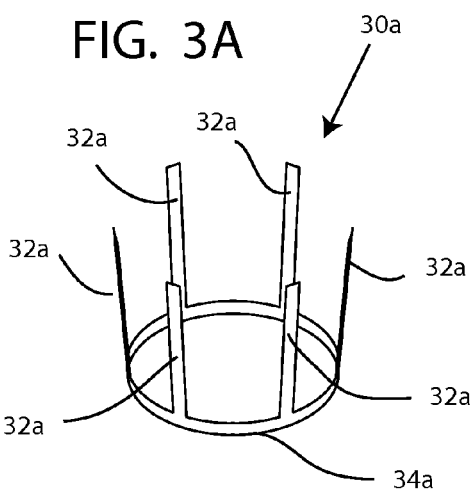
FIG. 3B depicts a perspective view of a second embodiment of the second securing means.

Referring again to FIG. 1, and additional reference to FIGS. 3A and 3B, embodiments of the wearable animal waste collection device 100 may include a second securing means 30, or second securing portion 30. Embodiments of the second securing means 30 may be configured to removably secure, support, hold, accommodate, carry, etc., a collection portion 55 of a direct collection device 50, the direct collection device 50 configured for collection of animal waste, described in greater detail infra. Embodiments of the second securing portion 30 may be attached, affixed, fastened, mounted, adhered, joined, etc. to the wearable structure 60. Embodiments of the second securing means 30 may be directly attached to the attachment portion 63 of the wearable structure 60. Alternatively, the second securing means 30 may be attached directly to the band portion 66. The first securing means 20 and the second securing means 30 may be approximately between 1" to 3" apart from one another on the attachment portion 63, or band portion 66. Embodiments of the second securing means 30 may be a structure configured to releasably hold the direct collection device 50. In one embodiment, shown in FIG. 3A, the second securing means 30 may be a cup-like device having a top end 31 and a bottom end 32, and a body 35 defining the second securing means 30 between the top end 31 and the bottom end 32. Thus, the direct collection device 50, in particular, the collection portion 55 of the direct collection device 50 may be placed within the body 35 through the top end 31, which may hold, support, releasably engage, etc., the direct collection device 50 until the direct collection device 50 is needed. Embodiments of the cup-like second securing means 30 may have a volume or space within the body 35 to receive the collection portion 55. Moreover, embodiments of the second securing means 30 shown in FIG. 3A may include a lip 38 that may mate with or engage a lip 58 of the collection portion 55.

FIG. 3B depicts an alternative embodiment of the second securing means 30a may include a plurality of resilient fingers 32a extending from an annular base 34a to accommodate a collection portion 55 of the direct collection device 50. For instance, the plurality of fingers 32a and the annular base 34a may define a basket for receiving the collection portion 55 of the direct collection device 50. The plurality of fingers 32a may resiliently engage the collection portion 55 to releasably secure the direct collection device 50 to the wearable structure 60. The second securing means 30, 30a may be available in different sizes, depending on the size of the wearable structure 60 or the size of the animal. In one embodiment, the second securing means 30 may have a largest diameter between 3" and 5", and a height between 2" and 5". Furthermore, embodiments of the second securing means 30, 30a may be comprised of a plastic material, a composite material, a hard plastic, metal, rubber, and a combination thereof.

Figure 4:
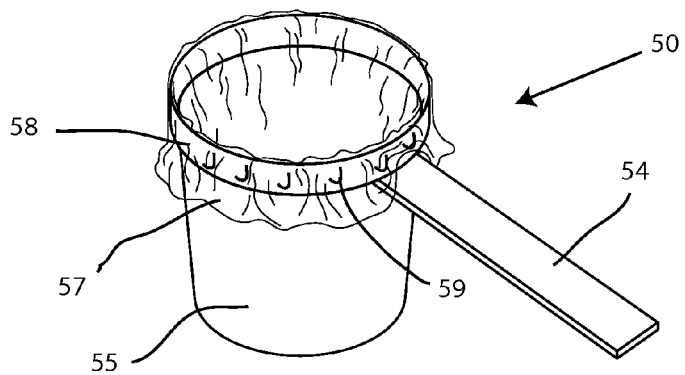
FIG. 4 depicts a perspective view of an embodiment of a direct collection device.

Referring now to FIG. 4, embodiments of the wearable animal waste collection device 100 may include a direct collection device 50. Embodiments of the direct collection device 50 may be configured to collect and temporarily store animal waste. Embodiments of the direct collection device 50 may include a collection portion 55 and a handle portion 54. Embodiments of the collection portion 55 may be configured to be in a resting and/or removable engagement with the second securing means 30, 30a. Embodiments of the collection portion 55 may be a storage container, such as a cup, having a volume. The collection portion 55 may include a bottom surface and a wall, wherein the top of the collection portion is open to receive animal waste. The collection portion 55 may have a circular or curvilinear cross-section, or may have a square or rectangular cross-section. Moreover, embodiments of the collection portion 55 may be lined with a disposable plastic liner 57 to protect or prevent contact between animal feces and the collection portion 55. The disposable liner 57 may fit within the collection portion 55, wherein a portion of the disposable liner 57 extends beyond and outside the collection portion 55. The portion of the disposable liner 57 extending outside the collection portion 55 may interact with a plurality of hook members 59 located along a lip 58 of the collection portion 55. For instance, the disposable liner 57 may be fastened to the lip 58 of the collection portion 55 by gripping the liner 57 and stretching or placing it into contact with the hook members 59 to secure the liner 57 in place, which may avoid the liner 57 from collapsing into the collection portion 55 when animal waste enters the collection portion 55. However, other fastening devices may be used to secure the liner 57 to the collection portion 55, such as an elastic band that may go around the liner 57 and secure the liner to the lip 58 or other portion of the collection portion 55, or an adhesive applied to the plastic liner prior to installation within the collection portion 55. The collection portion 55 may be rigid, for example, the structure of the collection portion 55 may be rigid or otherwise non-resilient when animal waste enters the opening of the collection portion 55 and fills the collection portion 55. A rigid-like body of the collection portion 55 may provide structural integrity and reduce flexing and/or bending of the direct collection device 50 when collecting animal waste. Furthermore, embodiments of the collection portion 55 may be comprised of a plastic material, a hard plastic, a composite material, metal, or a combination thereof.

Embodiments of the direct collection device 50 may include a handle portion 54 connected to the collection portion 55. Embodiments of the handle portion 54 may be structurally integral with the collection portion 55, or may be fastened to the collection portion 55 through fastening means known to those skilled in the art. The handle portion 54 may extend from the collection portion 55 a distance sufficient for a user 10 to grip, hold, etc., the rigid handle portion 54. In most embodiments the handle portion 54 permanently attached to the collection portion 54 can extend a distance sufficient to allow the user 10 to manipulate the direct collection device 50 into a position of collection of animal waste, without risking accidental contact between the animal feces and the hand(s) of the user 10. Further, the length of the handle portion 54 may also determine how close the user 10 has to get to the animal's rear end while the animal is having a bowel movement. Those having ordinary skill in the art should appreciate that the length of the handle portion 54 may vary depending on various size and other design considerations. In addition, the handle portion 54 may be telescopic or otherwise adjustable so the user 10 can increase the length of the handle portion 54 when it is time to collect the animal waste and reduce the length when returning the direct collection device 50 to the second securing means 30, 30a. Embodiments of the handle portion 54 may be comprised of plastic, hard plastic, composite, metal, wood, and combinations thereof.

Figure 5A:
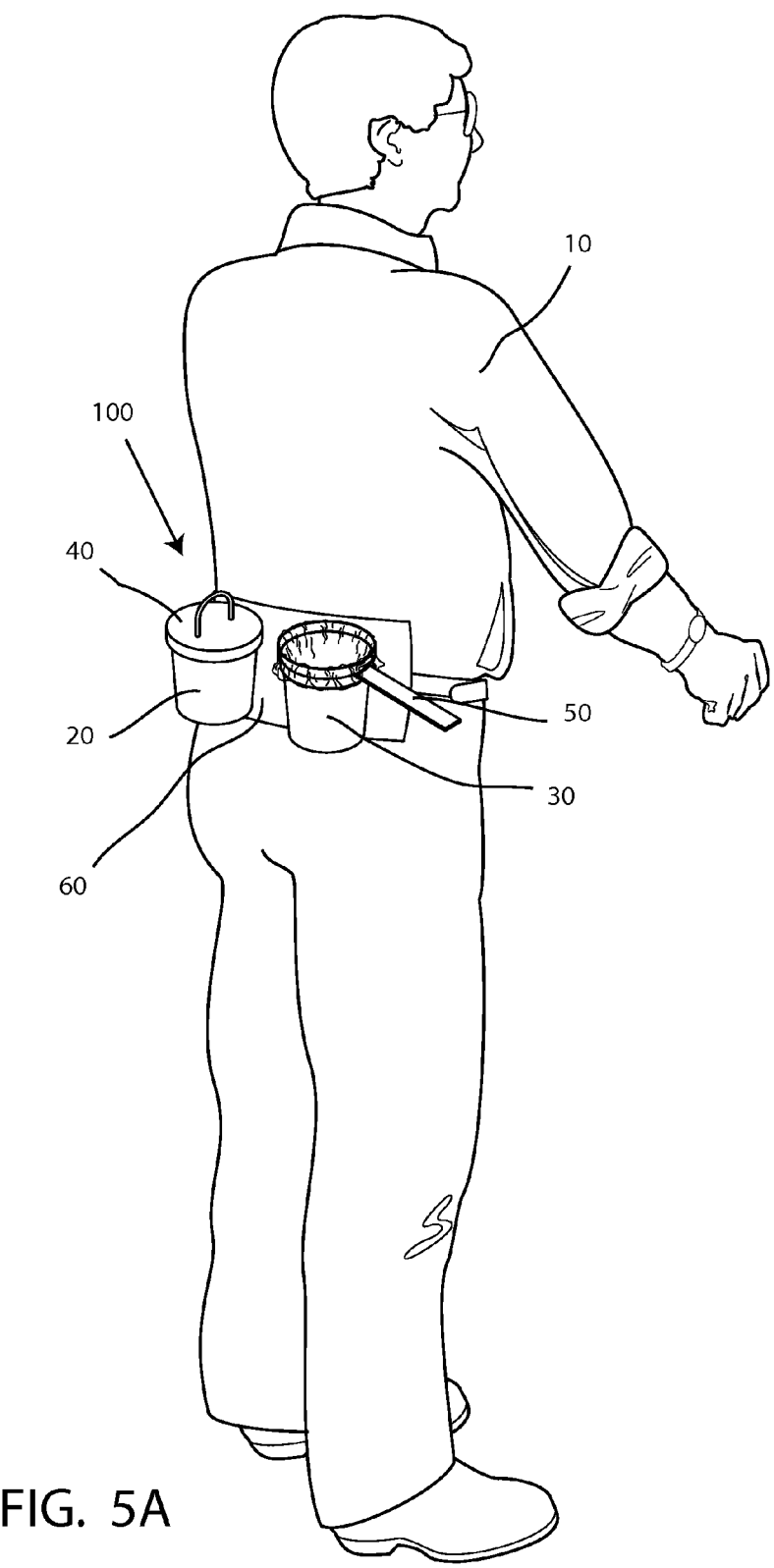
FIG. 5A depicts a perspective view of an embodiment of the wearable animal waste collection device worn by a user, wherein the direct collection device is in a secured, uncovered position.
Figure 5B:
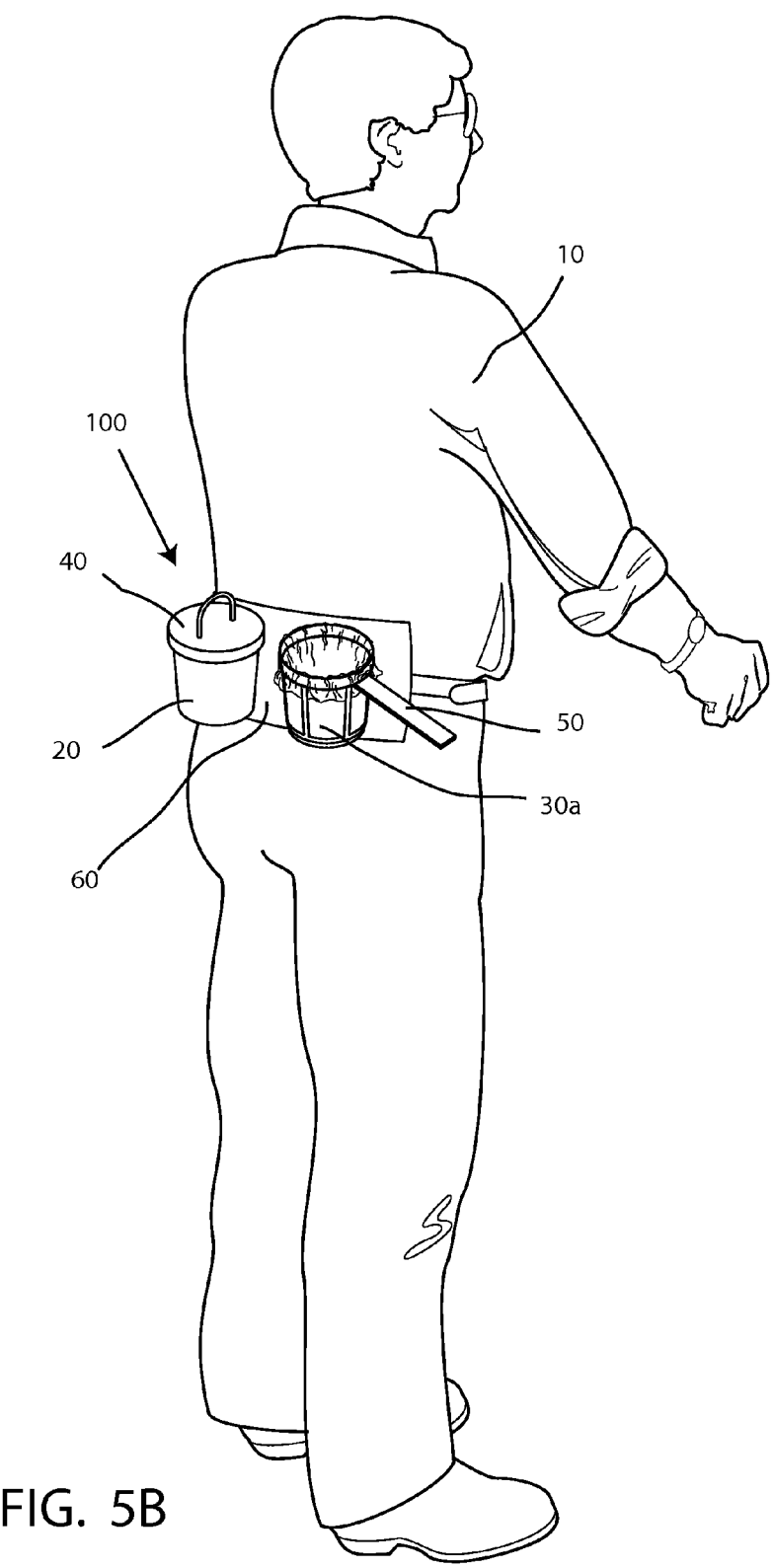
FIG. 5B depicts a perspective view of an embodiment of the wearable animal waste collection device worn by a user, wherein the direct collection device is in a secured, uncovered position.
Figure 6:
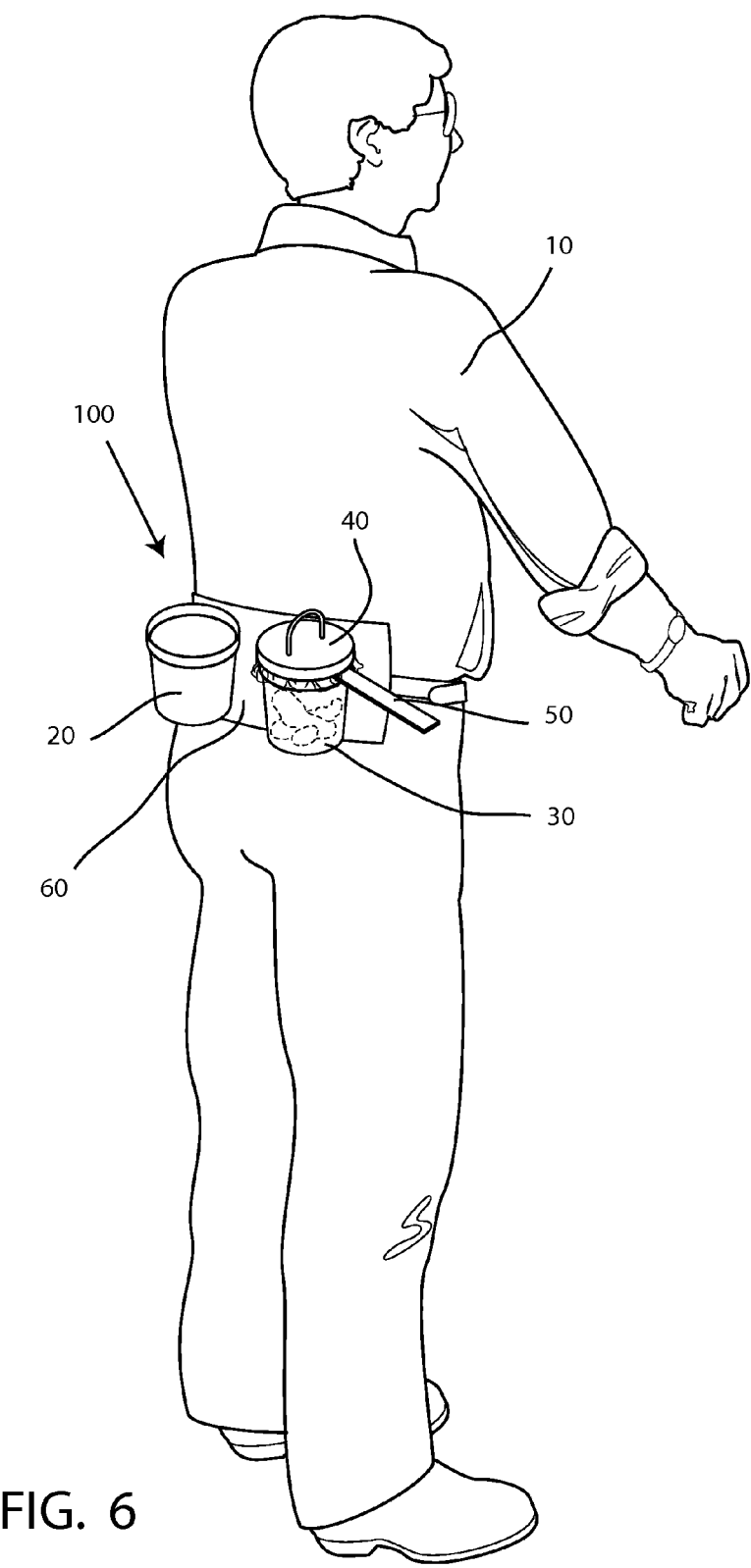
FIG. 6 depicts a perspective view of an embodiment of the wearable animal waste collection device worn by a user, wherein the direct collection device is in a secured, covered position, temporarily storing animal waste.

Referring now to FIGS. 5A-6, the manner in which the wearable animal waste collection device 100 may be used will now be described. FIGS. 5A and 5B depict an embodiment of the wearable animal waste collection device 100 in a first position, wherein, when in the first position, the wearable animal waste collection device 100 is worn by the user 10, and no waste has been collected. For instance, the wearable structure 60 is being worn around the waist of the user 10, the first securing means 20 is accommodating the top cover portion 40, and the second securing means 30, 30a is accommodating the direct collection device 50. The first position of the wearable animal waste collection device 100 may be a time before the animal has a bowel movement; the user 10 may have both hands free, or may have at least one hand free if one hand is holding a leash. When the animal is about have a bowel movement and defecate onto the ground, the user 10 may reach for the handle portion 54 and grab the direct collection device 50. Once the user 10 grabs the direct collection device 50, the user 10 may position the collection portion 55 of the direct collection device 50 proximate or otherwise near or underneath the hindquarters of the animal to catch, collect, capture, etc., the animal feces before they contact a ground surface, such as a street, lawn, sidewalk, or grass or concrete surface. The rigid body of the collection portion 55 can help the user 10 catch the feces because it will not deform or crumple when the animal waste contacts the collection portion 55; the lack of deformation of the collection portion 55 when the waste is collected allows for reuse of the direct collection device 50, and sturdy/firm/secure engagement with the second securing means 30, 30a. Because the animal waste is collected by the direct collection device 50 before the waste lands on the ground, the user 10 does not have to bend down and pick up the waste with their hands (likely covered by an inside-out plastic bag).

As shown in FIG. 6, after the animal waste has been collected or captured in the collection portion 55, the user 10 may return the collection portion 55 to the second securing means 30, 30a located on the wearable structure 60 around their waist. To eliminate and/or reduce the odor of the animal waste and prevent spillage of the waste, the user 10 may detach or remove the top cover portion 40 from the first securing means 20 and place the top portion 40 over the collection portion 55 to cover the animal waste within the collection portion 55. This may be referred to as a second position, wherein the wearable animal waste collection device 100 is worn by the user, the direct collection device 50 is temporarily storing animal waste and is secured by the second securing means 30, 30a, and the top cover portion 40 may be engaged with the collection portion 55 of the direct collection device 50. Embodiments of the top cover portion 40 may include a gripping means 45, such as a loop or hook, for the user 10 to conveniently grab, remove, and place the top cover portion 40 onto the collection portion 55 and back onto the first securing means 20 in the event the direct collection device 50 is needed more than once before the waste is disposed. Moreover, embodiments of the top cover portion 40 may be lined with a disposable plastic liner 47 to protect the top portion 40 from contact with the animal waste. The top cover portion 40 may include a plurality of hook members 49, or other liner gripping means, to allow the disposable liner 47 to be secured into place, similar to the hook members 59 located along the lip 58 of the collection portion 55, or the liner 47 may include a pre-applied adhesive, such as an adhesive tab, for adhering to the edge of the top cover portion 40. To further prevent odors from escaping the collection portion 55 and/or preventing or hindering the top cover portion 40 from unwanted disengagement from the collection portion 55, the top cover portion 40 and the collection portion 55 may have opposingly tapered surfaces. Other mechanical means may be employed to obtain a snug engagement/press-fit engagement between the top cover portion 40 and the collection portion 55 may be used, such as a tongue and groove, hook and loop, ball and detent, and various lips and corresponding detents. Furthermore, the animal waste may be stored within the collection portion 55 of the direct collection device 50 which is in resting and/or removable engagement with the second securing means 30, 30a until the user 10 has a chance to dispose of the waste. It should be noted that while the user 10 is wearing the wearable animal waste collection device 100 and after (or before) the animal waste is stored within the collection portion 10 and the direct collection 50 is re-engaged with the second securing means 30, the user 10 does not have to carry a bag or other container of waste, which allows the user 10 to have at least one hand free while outdoors with the animal. To dispose of the animal waste, the user 10 may simply detach the plastic liner 57 which holds the waste from the collection portion 55 and dispose of the plastic liner 57 containing the waste. The user 10 may also detach the plastic liner 47 from the top cover portion 40. The liners 47, 57 may be replaced for the next use of the wearable animal waste collection device 100.

Referring to FIGS. 1-6, a method of animal waste collection comprising providing a wearable animal waste collection device 100 comprising a wearable structure 60 configured to be worn around a waist of a user 10, a top cover portion 40 secured by a first securing means 20 attached to the wearable structure 60, and a direct collection device 50 having a rigid collection portion 55 and a rigid handle portion 54, the direct collection device 50 being secured by a second securing means 30 attached to the wearable structure 60, wherein an animal waste is collected with the direct collection device 50 before the animal waste reaches a ground surface, wherein the animal waste is temporarily stored in the rigid collection portion 55 of the direct collection device 50.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A wearable animal waste collection device comprising:
   a wearable structure configured to be worn by a user;
   a first securing means attached to the wearable structure, the first securing means structured to removably accommodate a top cover portion; and
   a second securing means attached to the wearable structure, the second securing means structured to removably accommodate a direct collection device;
   wherein the direct collection device is used to directly collect an animal waste before the animal waste reaches a ground surface;
   wherein the first securing means, the top cover portion, and the direct collection device are lined with a disposable plastic liner.

2. The wearable animal waste collection device of claim 1, wherein the top cover portion is configured to be placed into a snug engagement with a collection portion of the direct collection device after the animal waste is collected.

3. The wearable animal waste collection device of claim 1, wherein the direct collection device includes a collection portion and a handle portion fixed to the collection portion.

4. The wearable animal waste collection device of claim 1, wherein the ground surface is at least one of a street, a sidewalk, a lawn, and a grass surface.

5. The wearable animal waste collection device of claim 1, wherein the wearable structure comprises a band portion and an attachment portion.

6. A wearable animal waste collection device comprising:
   a wearable article configured to be worn around a waist of a user;
   a top cover portion secured by a first securing means when in a first position, the first securing means attached to the wearable article; and
   a direct collection device having a rigid collection portion and a rigid handle portion, the direct collection device being secured by a second securing means when in the first position and a second position, wherein the second securing means is attached to the wearable article;
   wherein the top cover portion is placed into engagement with the rigid collection portion in the second position.

7. The wearable animal waste collection device of claim 6, wherein the collection portion is configured to receive an amount of animal waste before the animal waste reaches a ground surface when an animal has a bowel movement.

8. The wearable animal waste collection device of claim 7, wherein the ground surface is at least one of a street, a sidewalk, a lawn, and a grass surface.

9. The collection portion of claim 6, wherein the first securing means, the top cover portion, and the collection portion are lined with a disposable plastic liner.

10. The wearable animal waste collection device of claim 6, wherein the first securing means includes a top end, a bottom end, and a body defined between the top end and the bottom end.

11. The wearable animal waste collection device of claim 6, wherein the first securing means includes a ring structure protruding from the wearable article.

12. The wearable animal waste collection device of claim 6, wherein the second securing means includes a top end, a bottom end, and a body defined between the top end and the bottom end.

13. The wearable animal waste collection device of claim 6, wherein the second securing means includes a plurality of resilient fingers to resiliently accommodate the collection portion.

14. The wearable animal waste collection device of claim 6, wherein the wearable article comprises a band portion and an attachment portion.

15. A method of animal waste collection comprising:
   providing a wearable animal waste collection device comprising a wearable structure configured to be worn around a waist of a user, a top cover portion secured by a first securing means attached to the wearable structure, and a direct collection device having a rigid collection portion and a rigid handle portion, the direct collection device being secured by a second securing means attached to the wearable structure;
   wherein an animal waste is collected with the direct collection device before the animal waste reaches a ground surface;
   wherein the animal waste is temporarily stored in the rigid collection portion of the direct collection device.

16. The method of claim 15, wherein the ground surface is at least one of a street, a sidewalk, a lawn, and a grass surface.

17. The method of claim 15, wherein the first securing means, the top cover portion and the collection portion are lined with a disposable plastic liner.

18. The method of claim 15, wherein the wearable structure comprises a band portion and an attachment portion.

* * * * *